Feb. 18, 1958 M. J. UDY 2,823,983
PROCESS FOR THE PRODUCTION OF METALLIC SILICON
Filed Oct. 31, 1956 6 Sheets-Sheet 1

INVENTOR.
MARVIN J. UDY.
BY
Charles J. Elderkin
ATTORNEY.

Feb. 18, 1958  M. J. UDY  2,823,983
PROCESS FOR THE PRODUCTION OF METALLIC SILICON
Filed Oct. 31, 1956
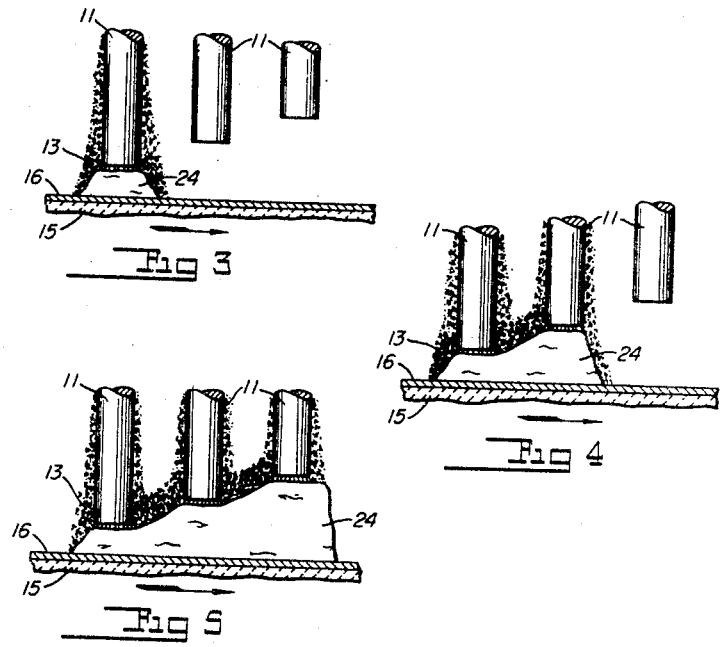
Fig 3
Fig 4
Fig 5
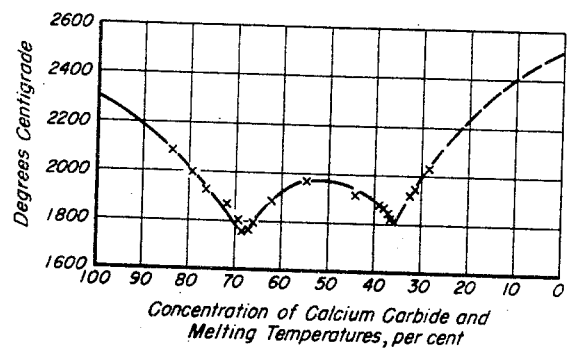
FUSION DIAGRAM OF THE SYSTEM $CaC_2$-$CaO$
Fig 6
INVENTOR.
MARVIN J. UDY.
BY
Charles J. Elderkin
ATTORNEY.

INVENTOR.
MARVIN J. UDY.
BY
Charles J. Elderkin
ATTORNEY.

INVENTOR.
MARVIN J. UDY.
BY Charles J. Elderkin
ATTORNEY.

Feb. 18, 1958 M. J. UDY 2,823,983
PROCESS FOR THE PRODUCTION OF METALLIC SILICON
Filed Oct. 31, 1956 6 Sheets-Sheet 5
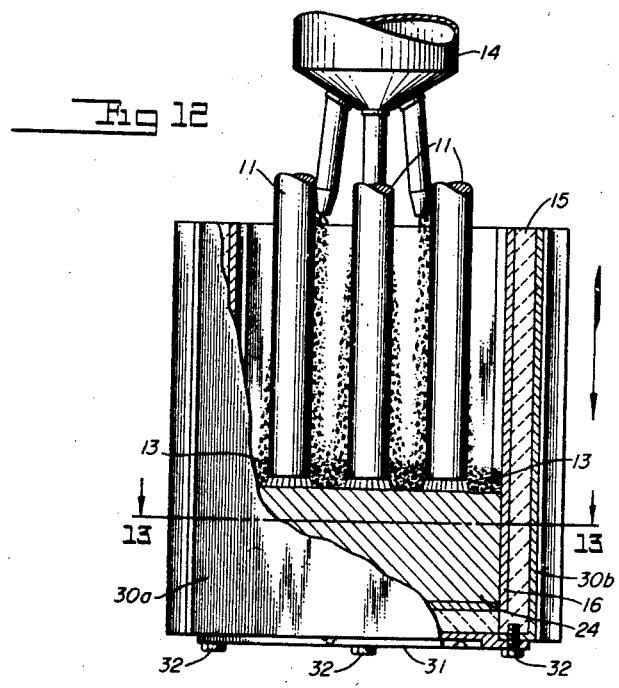
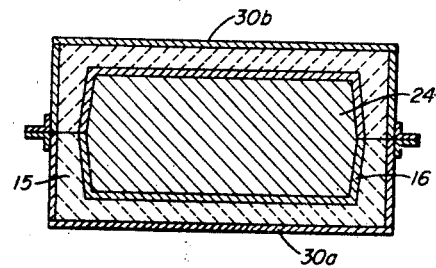
INVENTOR.
MARVIN J. UDY.
BY
Charles J. Elderkin
ATTORNEY.

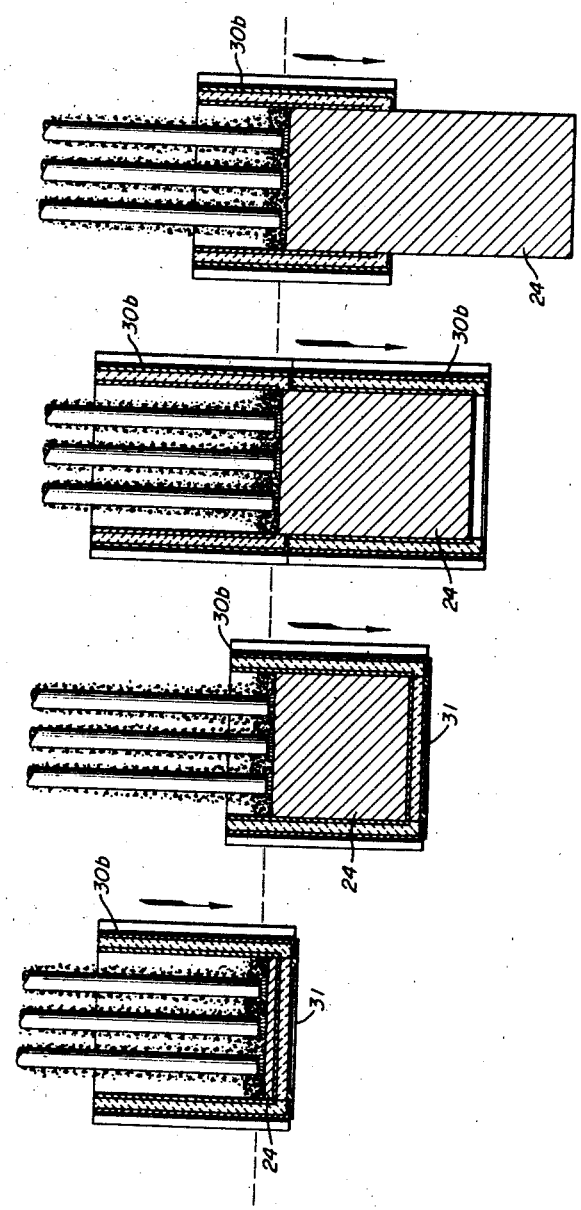

United States Patent Office 2,823,983
Patented Feb. 18, 1958

2,823,983

PROCESS FOR THE PRODUCTION OF METALLIC SILICON

Marvin J. Udy, Niagara Falls, N. Y., assignor to Strategic-Udy Metallurgical and Chemical Processes, Ltd.

Application October 31, 1956, Serial No. 619,559

1 Claim. (Cl. 23—223.5)

The present invention relates to an improved process and electric furnaces of the submerged-arc, or smothered-arc, type. More particularly, the present invention relates to a process and furnace for the production of calcium carbide and other binary compounds of carbon, calcium silicide and other binary compounds of silicon, titanium carbide and silicon and other similar elements.

Present-day production of calcium carbide, for example, is in a tapping furnace using three-phase power. The three electrodes are vertically mounted, in line, or at the points of an equilateral triangle. Raw materials containing calcium and carbon are charged around the electrodes to a depth of several feet. The reaction product is tapped at intervals through a tapping hole and run into chills, or molds, where the molten reaction product is solidified by cooling.

Prior to the adoption of the tapping furnace, ingot-type furnaces were used for the production of calcium carbide. The original ingot furnace was a steel box lined with carbon bricks. Using single-phase power, an arc was sprung between a single electrode mounted vertically above the box and the hearth electrode which was the bottom lining. During the run, the single vertically mounted electrode was raised manually as the reaction product was formed in the area beneath the electrode.

The original ingot furnaces are now considered obsolete. Their operation had a very low-energy efficiency, a high consumption of raw materials, high labor costs, and a low-production output.

The Horry rotary-type furnace was the next development and was intended to overcome the inherent disadvantages of the original ingot furnace. However, the Horry furnace was limited to the use of single-phase power and had a low-energy efficiency, together with a high consumption of raw materials, high labor costs and a low-production output.

The present-day tapping furnace using three-phase power is operated at a comparatively high-energy efficiency and is producing large quantities of calcium carbide at relatively low cost. However, even with the most efficient tapping furnace, it has never been found practical to produce a grade of calcium carbide higher than 85 percent. Eighty-five percent (85%) calcium carbide will yield about 4.7 cubic feet of acetylene per pound of carbide. This yield drops to more nearly 4.6 cubic feet by the time the calcium carbide is made ready for shipment to the consumer. The U. S. standard for large sizes of calcium carbide is 4.5 cubic feet of acetylene per pound of carbide, minimum.

One hundred percent (100%) pure calcium carbide should yield approximately 5.9 cubic feet of acetylene per pound of carbide. If 100 percent purity is reached, it means 1.2 cubic feet more acetylene per pound of carbide, or 25 percent more than from the same amount of carbide being now produced commercially. Theoretically, pure calcium carbide would require 100 percent pure lime and pure carbon. Materials are available in the purities that approach this value, and it has been possible by the practice of this invention to produce calcium carbide that will yield 5.6 cubic feet of acetylene, or 19 percent more acetylene than from the average grade of calcium carbide being produced commercially, and 24 percent more than that specified as the U. S. standard, minimum.

In the operation of a tapping furnace, a certain amount of the power input is consumed to make up the heat loss into the unreacted raw material and through the walls of the furnace. Still more of the power input is required to maintain the reaction product in a molten state so that the furnace will not "freeze" and become impossible to tap. The melting point of calcium carbide rises sharply as nearer 100 percent purity is reached. Pure calcium carbide has a melting point of 2300° C., whereas 83 percent pure calcium carbide has a melting point of only 2090° C. To maintain the interior of the tapping furnace at a temperature substantially higher than 2100° C., so as to permit the tapping of a calcium carbide more pure than 85 percent, becomes economically prohibitive.

Therefore, since a tapping furnace cannot be economically operated at a temperature higher than that at which 85 percent pure calcium carbide can be kept in the molten state so as to permit tapping, the carbon balance in relation to temperature and lime content becomes extremely critical. If carbon-containing materials (carbon, coke, charcoal, coal, etc.) are present in excess of the amount of carbon required stoichiometrically for the production of 85 percent pure carbide, the excess carbon causes an increase in conductivity of the charged raw materials, making it impossible to maintain the electrode position as well as increasing the purity of the carbide toward 100 percent, which makes tapping impossible and may even cause total freezing of the carbide in the bottom of the furnace.

To reduce this amount of excess carbon at any given temperature, it is necessary either to increase the operating temperature of the furnace nearer to the melting point of pure calcium carbide (2300° C.) or else to add large quantities of calcium-containing materials, such as free lime, at regular intervals, until the carbon returns to the normal operating amount. If free lime is required to be added, the quality of the carbide varies over a wide range and the product has little uniformity.

The tapping furnace also presents severe difficulties in that the addition of free lime to an operating furnace results in fuming and dusting with a resultant increase in consumption of raw materials and contamination of the area surrounding the furnace installations.

Therefore, it is an object of this invention to provide an improved process and electric furnaces of the submerged-arc, or smothered-arc, type for the production of calcium carbide and other products that will not require the step of cooling the reaction product in chills or molds.

Another object of this invention is to provide an improved process, and furnaces that will have a high-energy efficiency in that the power input will be primarily consumed to perform a chemical reaction and not to maintain the product of the reaction at a temperature above its melting point so as to permit its removal from the furnace in a molten state.

Still another object of this invention is to provide an improved process and furnaces which will utilize a power input of at least 50 kw. per cubic foot of reactant materials and preferably will be operated with a power input of at least 100 kw. per cubic foot of reactant materials.

Still another object of this invention is to provide an improved process and electric furnaces for the production of calcium carbide that will produce calcium carbide that will give a substantially higher gas yield than the calcium carbide produced commercially in the present-day tapping furnace.

Still another object of this invention is to provide an improved process and electric furnaces for the production of calcium carbide in the operation of which excess carbon is not detrimental or deleterious; that is, a process which does not require the intermittent addition of free lime for the purpose of lowering the excess of carbon to a satisfactory operating amount.

Still another object of this invention is to provide an improved process and furnace for the production of calcium carbide that will permit a high production from a given amount of raw material.

Still another object of this invention is to provide an improved process and electric furnaces in which a large and stable ingot of reaction product is produced.

Still another object of this invention is furnaces which will permit the practice of this invention with all of its inherent advantages.

Other objects and advantages of this invention will be apparent from the following detailed disclosure and description thereof.

In the practice of this invention, the design of the furnace incorporates a theory of electrode spacing in which the minimum distance between electrodes measured from center line to center line should be two electrode diameters when utilizing the smallest size of charge raw-material particles. The minimum distance between the outside surface of the electrode and the furnace lining should be one electrode diameter when utilizing the smallest size charge particle. The minimum distance between electrodes measured from center line to center line should be two and one-half electrode diameters when utilizing the largest size of charge particles. The minimum distance between the outside surface of the electrode and the furnace lining should be one and one-half electrode diameters when utilizing the largest size charge particle. The maximum distance between electrodes and between the electrodes and furnace lining will be dependent upon the rate at which the furnace vessel is moved away from the electrodes as hereinafter described.

The electrode diameter is determined by the amount of power input. The amount of power input is determined by the desired ton-per-hour capacity of the furnace.

For the production of calcium carbide, the charge of carbon-containing raw materials and of calcium-containing raw materials have a size ranging from approximately one inch in diameter to three inches in diameter. Smaller size raw materials may be used with satisfactory results, although it may not be commercially practicable.

By establishing the electrode spacing, as set forth above, it is possible to design and operate a furnace in which the electrodes remain in a stationary fixed axis, while the furnace vessel proper is being continually moved away from the electrodes. The charge of raw materials is added in the area immediately surrounding the electrodes and the reaction product is formed in the arc of the electrodes. The moving furnace vessel causes the reaction product to be removed from the reaction zone in the arc of the electrodes immediately after formation.

The electrode spacing is such that the reaction zones created in the arc of the electrodes are maintained in relation to each other so that the outer limits of each reaction zone are contiguous, meaning touching along a considerable part or the whole of one side, though not coalesced, meaning not extending over into the other in any substantial degree.

In the operation of the furnace, automatic electrode regulators are set to maintain the electrodes in constant or substantially fixed positions relative to the upper surface or limit of each reaction zone. When an increase or decrease in the temperature of each reaction zone is desired, the voltage to the electrodes is increased or decreased and the electrode regulators are adjusted to maintain the proper relative position or depth between the electrode tips and the upper surface of the reaction zones.

The removal of the reaction product may be in a horizontal plane away from the electrodes, on an angular plane in relation to the electrodes or in a vertical plane down and away from the electrodes. This theory of furnace operation is predicated upon the formation of a pool of molten reaction product in the area surrounding the electrode tip. If there is correct electrode spacing, and the correct electrode depth is maintained, then the reaction product formed in the area beneath the electrodes will cool and solidify as it is being removed from the area beneath the electrodes.

Figure 1:
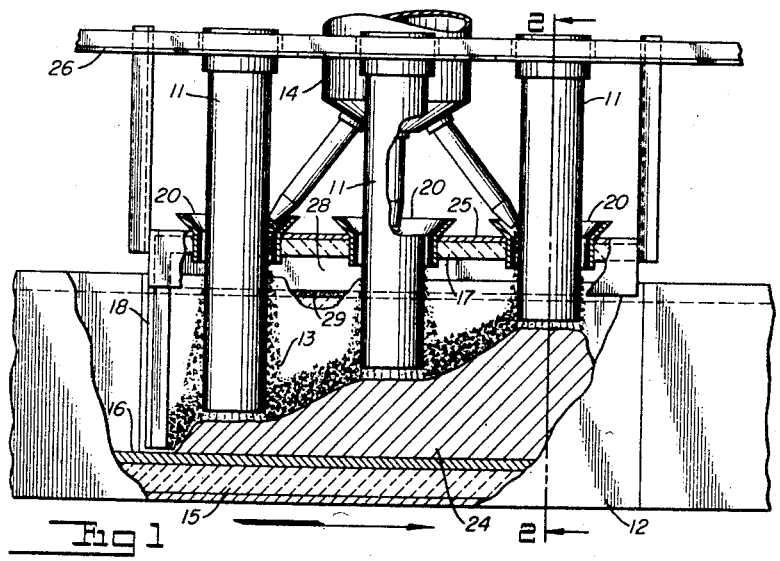
Fig. 1 is an elevational sectional view of a horizontally movable furnace.
Figure 2:
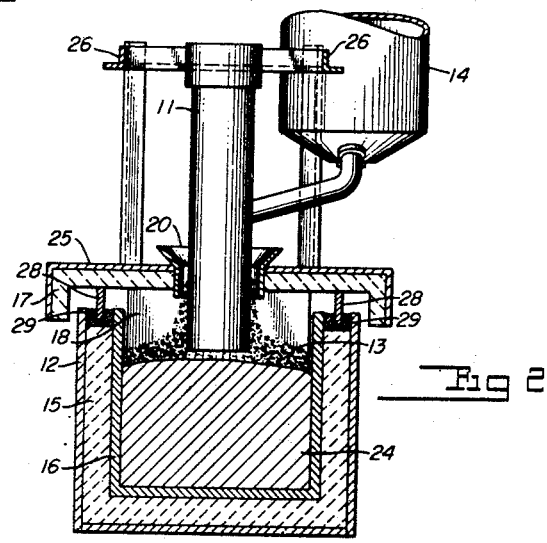
Fig. 2 is a sectional end view on line 2—2 of Fig. 1.
Figure 7:
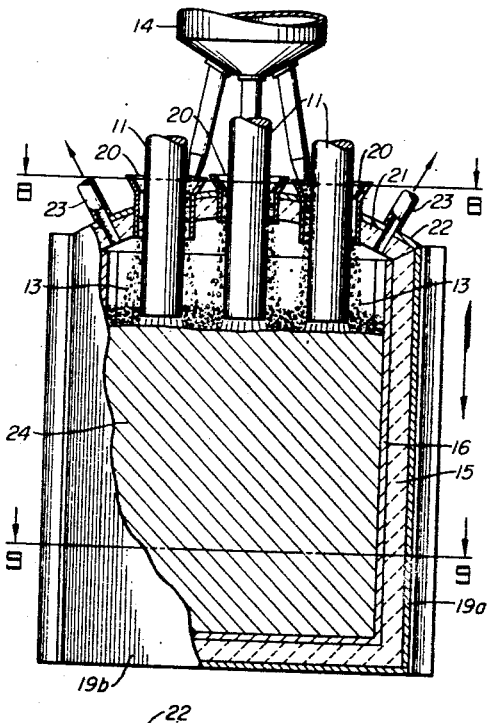
Figure 8:
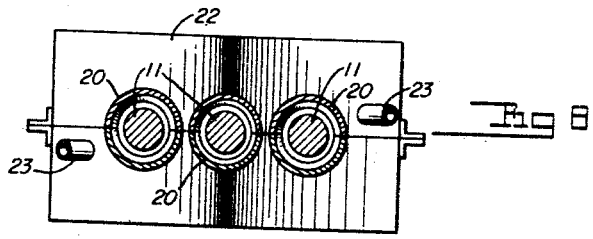
Figure 9:
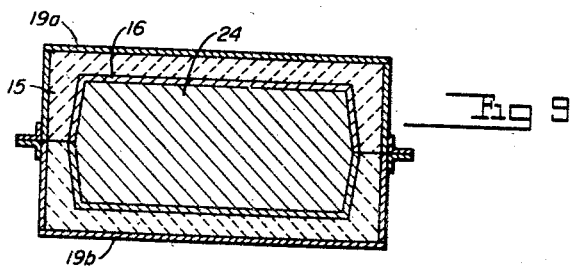
Figure 10:
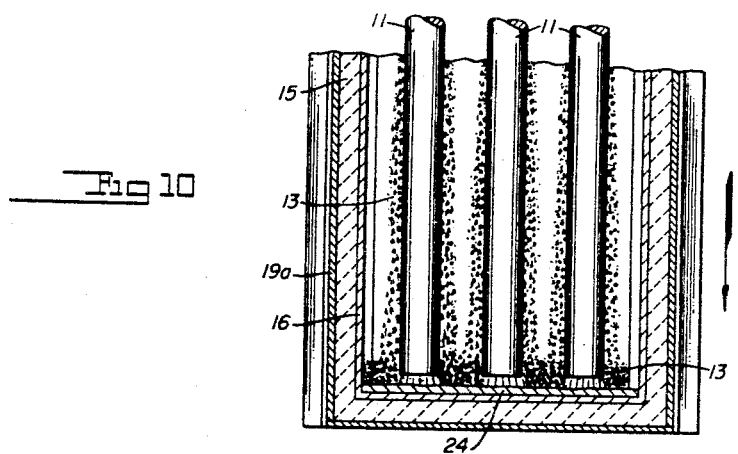
Figure 11:
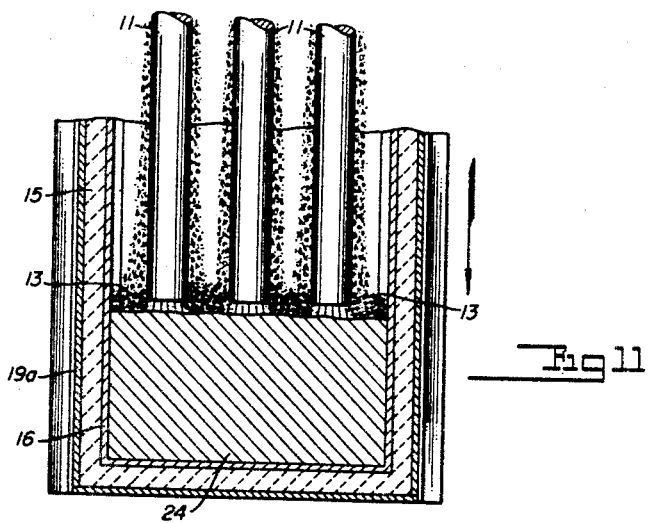

Figs. 3, 4, and 5 show the formation of an ingot in a horizontal furnace of the type shown in Figs. 1 and 2;

Fig. 6 is a fusion diagram of the system $CaC_2$—$CaO$ intended to illustrate the increase in melting point as nearer 100 percent purity of $CaC_2$ is reached;

Fig. 7 is an elevational sectional view of a vertically movable furnace;

Fig. 8 is a view on line 8—8 of Fig. 7;

Fig. 9 is a sectional top view on line 9—9 of Fig. 3;

Figs. 10 and 11 show the formation of an ingot in a vertical furnace of the type shown in Fig. 7;

Fig. 12 is an elevational sectional view of a vertically movable furnace which can be operated continuously;

Fig. 13 is a view on line 13—13 of Fig. 12; and

Fig. 14 shows the continuous formation of an ingot in a vertically movable furnace of the type shown in Fig. 12.

In the horizontal-type furnace, Fig. 1, the electrodes 11 are placed at different elevations and so spaced that the reaction zones around the electrodes meet but do not overlap and there are three distinct reaction zones. The furnace vessel 12 moves in a direction such that the electrodes 11 are tending to move away from the charge raw materials 13 which are charged from a water-cooled hopper 14 through metal funnels 20. The inner walls and bottom of the furnace vessel are lined with an insulating material 15 which is, in turn, faced with carbon brick 16.

The furnace vessel 12 may be covered with a refractory brick cover 17 suspended from the electrode support structure 26. The cover has a metal shell 25. A refractory baffle 18 is hung from the cover 17 so that the baffle is always tending to move away from the charge into the empty end of the furnace vessel 12. A metal flange 28 is supported from the refractory brick cover 17 by suitable means. The flange 28 is forced through a sand layer 29 as the furnace vessel 12 moves, and forms a continuous upper gas seal. The forward gas seal is formed by unreacted charge raw materials 13 falling up against the baffle 18 and the bottom carbon brick facing 16. The gases formed by the reaction are removed from beneath the cover 17 to a gas scrubber (not shown) which actuates control valves (also not shown) so as to maintain a positive pressure of at least one-quarter inch. The small amount of gas escaping around the electrodes 11 is allowed to burn as a safety and as a visual indication to the operator as to whether the furnace is under pressure.

Figs. 3, 4, and 5 illustrate the formation of an ingot 24 in a horizontal-type furnace. The charge raw materials 13 are reacted in the area surrounding the tip of the electrodes 11 to form the reaction product 24. If correct electrode spacing is maintained, then the reaction product 24 formed in the area surrounding the first electrode (Fig. 3) will have cooled and solidified by the time the furnace vessel has moved the reaction product beneath the second electrode and, thus, the reaction product formed in the area surrounding the second electrode will form a somewhat higher layer on top of the reacted product from the first electrode (Fig. 4). The second layer will have cooled and solidified by the time the furnace vessel moves the reacted product from the area surrounding the second electrode to the area surrounding the third electrode (Fig. 5). Thus, the reaction product formed in the area surrounding the third electrode will form on top of the layers of reaction product from the first and second electrodes.

In the vertical-type furnace, Fig. 7, the electrodes 11 are placed at the same elevation and so spaced that the reaction zones meet but do not overlap. The furnace vessel is constructed in two halves, 19a and 19b, which are lined with an insulating material 15 which is faced with carbon brick 16. A suitable clamping means (not shown) may be provided to hold the furnace vessel halves 19a and 19b together. The charge raw materials 13 are charged from a water-cooled hopper 14 into the area surrounding the electrodes 11 through metal funnels 20.

The furnace vessel 19a and 19b may be covered with a refractory cover 21 having a metal shell 22. The gases formed by the reaction are removed from beneath the cover through gas outlet pipes 23 to a gas scrubber (not shown) which actuates control valves (also not shown) so as to maintain a positive pressure of at least one-quarter inch. The small amount of gas escaping around the electrodes 11 is allowed to burn as a safety and as a visual indication to the operator as to whether the furnace is under pressure.

In operation of the vertical-type furnace, the split halves of the furnace 19a and 19b and the ingot of reaction product 24 move in a vertical direction away from the electrodes 11.

Fig. 10 shows the reaction product 24 being formed when the furnace vessel 19a and 19b is in its highest position. The furnace vessel is lowered and the ingot of reaction product is built up as shown by Fig. 11. If correct electrode spacing is maintained, then an ingot of reaction product will be formed which will be solid.

In the vertical-type continuous furnace, Fig. 12, the electrodes 11 are placed at the same elevation and so spaced that the reaction zones meet but do not overlap. The furnace vessels are constructed in two halves, 30a and 30b, which are lined with an insulating material 15 which is faced with carbon brick 16. A furnace bottom plate 31, with insulating material 15 and carbon brick facing 16, is provided for fastening by bolts or other suitable means to the bottom of the furnace vessel halves 30a and 30b. A suitable clamping means (not shown) may be provided to hold the furnace vessel halves 30a and 30b together. The charge raw materials 13 are charged from a water-cooled hopper 14 into the area surrounding the electrodes 11. The gas escaping from the furnace may be collected by suitable duct work (not shown) or allowed to burn above the furnace.

Fig. 14 shows a continuous operation of the vertical-type furnace. View a shows the furnace vessel in its highest position with bottom plate 31 in position. View b shows that the electrodes have remained stationary while the furnace vessel is moving away from the electrodes. The ingot of reaction product 24 has been formed atop the bottom plate 31 which has not yet been removed. View c shows that the bottom plate 31 has been removed, that the ingot of reaction product has been formed to a point above the first furnace vessel and that the second, or top, furnace vessel has been placed in position around the electrodes. View d shows that the first, or bottom, furnace vessel has been removed from around the ingot and that the formation of the ingot of reaction product is continuing within the second furnace vessel. The ingot of reaction product extending below the second furnace vessel is broken off by suitable mechanical means and is made ready for shipment to the consumer. Meanwhile, the first furnace vessel is being made ready for placing in position around the electrodes atop the second furnace vessel (view c). Thus, the operation of the furnace becomes continuous. The bottom furnace vessel becomes the top, and vice versa. Once the furnace has been started, as shown in views a and b, the operation becomes continuous, as shown by views c and d.

The following examples are submitted by way of illustration only, and are not to be construed as limiting the invention thereto.

Example I

A horizontal furnace of the type shown in Fig. 1 was used. The three graphite electrodes were two and one-half inches in diameter and were spaced six and one-half inches apart, center to center, in line. The interior of the furnace was seven and one-half inches in width, from one wall of carbon brick lining to the other wall of carbon brick lining. The furnace vessel was charged during an hour and twenty minutes run under power with 145 pounds of high-calcium lime and 100 pounds of petroleum coke having a particle size of from 3-mesh to 20-mesh. The furnace vessel was started moving 9 minutes after the power was turned on and was run at a rate of one-half inch per minute for 71 minutes in a direction past the electrodes, as shown by Figs. 3, 4, and 5. The total power consumption was 321 kw. hr. Assuming that the raw materials were charged to an average depth of six inches, the power input was 450 kw. per cubic foot of raw materials. A large and stable ingot of calcium carbide weighing 129 pounds was produced. On standard analysis, the calcium carbide yielded 5.61 cubic feet of $C_2H_2$ per pound of product. There was very little unreacted charge material left on the top, sides, and bottom.

Example II

A vertical furnace of the type shown in Fig. 7 was used. The three graphite electrodes were two and one-half inches in diameter, and were spaced five and one-half inches apart, center to center, in line. The interior of the furnace was eleven and one-half inches in width, and twenty-two and one-half inches in length, carbon brick lining face to face. The furnace vessel was charged during an hour-and-twenty-two minute run under power with 199 pounds of high-calcium lime and 137 pounds of petroleum coke having a particle size of from 3-mesh to 20-mesh. The furnace vessel was started moving nine minutes after the power was turned on and was lowered at a rate of one-half inch per minute for one hour and 13 minutes in a direction away from the electrodes, as shown by Figs. 10 and 11. The total power consumption was 241 kw. hr. Assuming that the raw materials were charged to an average depth of six inches, the power input was 220 kw. per cubic foot of raw materials. An ingot of calcium carbide weighing 134 pounds was produced; 125 pounds of unreacted charge material was recovered from the top and side of the ingot and from the furnace vessel. On standard analysis, the calcium carbide yielded 5.31 cubic feet of $C_2H_2$ per pound of product.

Example III

A horizontal furnace of the type shown in Fig. 1 was employed for the production of silicon metal. The three graphite electrodes were two and one-half inches in diameter and were spaced five and one-half inches apart, center to center, in linear alignment. The interior of the furnace was seven and one-half inches in width, from the inside surface of one wall of carbon brick lining to the other wall lining. The furnace vessel was charged with 1000 pounds of high-purity quartz of ninety-nine percent (99%) $SiO_2$ content, 467 pounds of petroleum coke of ninety-six percent (96%) fixed carbon content, plus an excess of coke averaging one-half of one percent to one percent (½–1.0%) excess by weight based on the theoretical quantity required. A large ingot of metal containing ninety-seven to ninety-nine percent (97–99%) metallic silicon was produced and discharged from the furnace with the excess coke overlying the ingot, i. e., on top of the finished metal.

The furnaces described herein have also been used to produce calcium silicide, ferrocarbo titanium, titanium carbide, silicon carbide, aluminum carbide, and fused aluminum oxide. In producing such products, the distance of the electrodes from the furnace lining may be somewhat less than one diameter where the reaction temperatures are high. Also, the higher the reaction temperature of the product being produced, the less should be the distance of the electrodes from each other.

Reference should be had to my copending application Serial No. 387,588 filed October 22, 1953, of which this application is a continuation-in-part, wherein I have described and claimed the process and apparatus of the invention as applied to the production of metallic carbides and metallic silicides. The present application is directed to the production of silicon metal by application of the foregoing principles and techniques.

An advantage of this invention is that the reaction product is allowed to cool and solidify immediately after leaving the reaction zone beneath the electrodes. Thus, the use of chills and molds is not required.

Still another advantage is that the input of three-phase power is principally used to produce the reaction product and is not used to maintain the reaction product at a temperature above its melting point.

Still another advantage is that a reaction product of high purity is produced because a high temperature may be maintained in the reaction zone. This high temperature permits the use of raw materials of a high degree of purity, which results in the production of a correspondingly high-purity reaction product. Further, the movement of the furnace vessel in a direction away from the electrodes causes the reaction product to cool and solidify while still in a state of high purity.

When the process and furnaces of the present invention are used for the production of calcium carbide, the furnace may be charged with 100 percent of the carbon-containing materials required for the grade of calcium carbide desired, plus an excess. The presence of excess carbon insures complete reaction of the calcium in the calcium-containing materials to form calcium carbide of the desired grade, and results in an efficient consumption of raw materials and a substantial reduction in dust loss. The presence of excess carbon in the furnace is not detrimental or deleterious because the furnace vessel is continuously moving away from the area beneath the electrodes, and thus the excess carbon cannot accumulate and interfere with the electrode regulation and normal furnace operation. In contrast thereto, it has been impossible to employ an excess of carbon over approximately that required for the production of eighty-five percent fixed calcium carbide products within the stationary furnaces heretofore employed by industry, with the result that such operations are usually conducted with charge materials containing carbon in the form of charcoal. The excess carbon or coke cannot accumulate within the furnace of the invention but is continuously discharged from the furnace on top of the finished metal, thereby avoiding any interference with the normal operation of the furnace.

As a corollary, free lime need not be added to reduce the excess carbon to a satisfactory operating balance. It is necessary to add only that amount of calcium-containing material as is required stoichiometrically to act with the theoretical amount of carbon present to produce calcium carbide of the desired degree of purity.

In the design and operation of any type of electric furnace, the single factor which is most important is the energy input per cubic foot of reactant material. The improved process and furnaces, as herein described, provide the highest energy input per cubic foot of reactant material that is known in the art, and thus represent an important advancement of the art. It is understood that the invention described and illustrated is not to be limited to the specific form or arrangement herein described and shown. It will be obvious to those skilled in the art that there are many modifications and variations of this improved process and furnace design which are practical, yet still within the scope and range of this invention, and it is intended that these should be included.

I claim:

Process for the production of silicon that comprises; supplying on a continuous basis from above, silicon-containing charge material to each of a plurality of contiguous arc-sustained high-temperature reaction zones maintained in substantially linear alignment within an electric arc furnace provided with a movable conveyor-type hearth; arc melting the charge material and continuously forming silicon within each of said high-temperature reaction zones; continuously moving the silicon thus produced by means of the movable hearth away from the respective reaction zones in a substantially unidirectional flow along the linear path of said reaction zones for eventual recovery from said hearth outside the furnace; and maintaining the furnace electrodes and successive reaction zones in the direction of movement of silicon at ascending stepped operating levels within the furnace; whereby the silicon formed in one high-temperature reaction zone, in moving towards eventual recovery outside the furnace, is passed beneath successive contiguous reaction zones at distances removed from the direct influence of the high-temperatures of said successive zones and effectively insulated therefrom by overlying charge material supplied to and undergoing reaction within said zones in the formation of additional quantities of silicon.

No references cited.